(12) United States Patent
Glueck et al.

(10) Patent No.: US 11,669,220 B2
(45) Date of Patent: Jun. 6, 2023

(54) EXAMPLE-BASED RANKING TECHNIQUES FOR EXPLORING DESIGN SPACES

(71) Applicant: AUTODESK, INC., San Francisco, CA (US)

(72) Inventors: Michael Glueck, Toronto (CA); Justin Frank Matejka, Newmarket (CA)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 15/925,631

(22) Filed: Mar. 19, 2018

(65) Prior Publication Data
US 2018/0267676 A1    Sep. 20, 2018

Related U.S. Application Data

(60) Provisional application No. 62/473,667, filed on Mar. 20, 2017.

(51) Int. Cl.
*G06F 3/0482* (2013.01)
*G06F 16/2457* (2019.01)
(Continued)

(52) U.S. Cl.
CPC ...... *G06F 3/0482* (2013.01); *G06F 16/24578* (2019.01); *G06F 30/00* (2020.01); *G06F 2111/04* (2020.01); *G06F 2111/06* (2020.01)

(58) Field of Classification Search
CPC .............. G06F 16/24578; G06F 17/50; G06F 2217/06; G06F 16/58; G06F 16/583;
(Continued)

(56) References Cited

U.S. PATENT DOCUMENTS

| 6,223,092 | B1 * | 4/2001 | Miyakawa | G05B 19/4097 |
| | | | | 700/103 |
| 7,000,183 | B1 * | 2/2006 | Crawford, Jr. | G06F 16/26 |
| | | | | 715/202 |

(Continued)

OTHER PUBLICATIONS

Kim et al., "Interaxis: Steering scatterplot axes via observation-level interaction", IEEE transactions on visualization and computer graphics, vol. 22, No. 1, Oct. 25, 2016, 131-140.

*Primary Examiner* — Wilson W Tsui
(74) *Attorney, Agent, or Firm* — Artegis Law Group, LLP (57) ABSTRACT

In various embodiments, a ranking application automatically ranks designs included in a design space based on user preference(s). The ranking application determines that a first design included in the design space is a first positive example of user preference(s). The ranking application then computes a score associated with a second design that is also included in the design space based on a first attribute value and a second attribute value. The first attribute value is associated with both the first design and an attribute and the second value is associated with both the second design and the attribute. Subsequently, the ranking application orders the designs based on the first score and a second score associated with the second design to generate a ranked list of designs. The ranking application then displays the ranked list of designs via a graphical user interface to facilitate exploration of the design space.

20 Claims, 3 Drawing Sheets

(51) Int. Cl.
  *G06F 30/00* (2020.01)
  *G06F 111/04* (2020.01)
  *G06F 111/06* (2020.01)
(58) Field of Classification Search
  CPC .. G06F 2111/04; G06F 3/0481; G06F 3/0482;
    G06F 30/00; G06F 2111/06; G06K
    9/6262
  See application file for complete search history.

(56) References Cited

U.S. PATENT DOCUMENTS

| | | | | |
|---|---|---|---|---|
| 8,165,406 | B2* | 4/2012 | Tan | G06F 16/583 |
| | | | | 382/224 |
| 8,868,446 | B2* | 10/2014 | Lamoureux | G06Q 30/02 |
| | | | | 705/14.72 |
| 9,104,670 | B2* | 8/2015 | Wadycki | G06F 16/24578 |
| 10,276,170 | B2* | 4/2019 | Gruber | G10L 17/22 |
| 2006/0112092 | A1* | 5/2006 | Ziou | G06F 16/54 |
| 2007/0078634 | A1* | 4/2007 | Krishnapillai | G06F 17/50 |
| | | | | 703/1 |
| 2009/0209878 | A1* | 8/2009 | Sanger | A61B 5/0488 |
| | | | | 600/546 |
| 2012/0173502 | A1* | 7/2012 | Kumar | G06F 16/48 |
| | | | | 707/706 |
| 2013/0110824 | A1* | 5/2013 | DeRose | G06F 16/90335 |
| | | | | 707/E17.084 |
| 2013/0173223 | A1* | 7/2013 | Teller | G06F 30/13 |
| | | | | 703/1 |
| 2013/0246119 | A1* | 9/2013 | Slaughenhoupt | G06Q 10/06 |
| | | | | 705/7.27 |
| 2014/0059040 | A1* | 2/2014 | Cha | G06Q 30/0241 |
| | | | | 707/722 |
| 2015/0134688 | A1* | 5/2015 | Jing | G06F 3/0482 |
| | | | | 707/766 |
| 2016/0307068 | A1* | 10/2016 | Pau | G06K 9/6223 |
| 2016/0371397 | A1* | 12/2016 | Deodhar | G06F 17/50 |
| 2016/0379143 | A1* | 12/2016 | Trubin | G06Q 10/067 |
| | | | | 703/2 |
| 2017/0097948 | A1* | 4/2017 | Kerr | G06F 3/04842 |
| 2017/0147719 | A1* | 5/2017 | Martinez Canedo | G06F 17/11 |
| 2017/0193390 | A1* | 7/2017 | Weston | G06N 20/00 |
| 2017/0220898 | A1* | 8/2017 | Rosoman | G06K 9/00664 |
| 2018/0088544 | A1* | 3/2018 | Sawada | G06F 19/00 |
| 2018/0268087 | A1* | 9/2018 | Tierney | G06F 17/5004 |
| 2018/0336479 | A1* | 11/2018 | Guttmann | G06N 20/00 |

\* cited by examiner

EXAMPLE-BASED RANKING TECHNIQUES FOR EXPLORING DESIGN SPACES

CROSS-REFERENCE TO RELATED APPLICATIONS

This application claims the priority benefit of the U.S. Provisional Patent Application having Ser. No. 62/473,667 and filed on Mar. 20, 2017. The subject matter of this related application is hereby incorporated herein by reference.

BACKGROUND

Field of the Various Embodiments

Embodiments of the present invention relate generally to computer-aided design and, more specifically, to example-based ranking techniques for exploring design spaces.

Description of the Related Art

Generative design is a computer-aided design process that automatically synthesizes designs that satisfy any number and type of high-level goals and constraints. In a typical generative design flow, a user specifies the high-level goals and constraints. A generative design application then executes a variety of multi-objective optimization algorithms to optimize potential solutions based on the high-level goals and constraints in an evolutionary process. The evolutionary process typically generates a vast number (e.g., tens of thousands) of designs that satisfy the high-level goals and constraints. The generative design application presents the designs to the user in the context of a design space. Finally, the user explores the design space, evaluating different designs included in the design space to select a single design for production.

A significant drawback of generative design is that evaluating the different designs in the design space is primarily a manual process that can be prohibitively time consuming if not impossible to complete. For example, in a generative design flow for a bicycle frame, a user could specify a variety of functional constraints (e.g., weight, volume, tensile strength, etc.). The generative design application would then typically generate a vast number of designs that satisfy the functional constraints. The number of potential designs could be on the order of thousands, if not tens of thousands. To fully explore the design space, the user would have to manually scrutinize the different designs to select a single design based on user preferences for non-functional, subjective aspects of the design. For example, the user would have to manually scrutinize potentially thousands of different designs to determine which design is both "more or less symmetric" and "skinniest" in appearance.

Because of the prohibitive amount of time required to manually explore the large number of designs typically generated for a given design space, users are often forced limit the number of designs that the generative design application generates. The resulting "limited" design space necessarily omits designs that would be included in the design space that would be generated by an "unlimited" generative design application. If any of the omitted designs were to reflect the preferences of the user better than the designs included in the limited design space, then the user would select a non-optimal design for production.

As the foregoing illustrates, what is needed in the art are more effective techniques for evaluating different designs in a design space.

SUMMARY

One embodiment of the present invention sets forth a computer-implemented method for automatically ranking designs. The method includes determining that a first design included in a set of designs is a first positive example of one or more user preferences; computing a first score associated with a second design that also is included in the set of designs based on a first attribute value associated with both a first attribute and the first design and a second attribute value associated with both the first attribute and the second design; ordering the designs included in the set of designs based on the first score and a second score associated with the first design to generate a ranked list of designs, where the order of the designs included in the ranked list of designs reflects the one or more user preferences; and displaying the ranked list of designs via a graphical user interface (GUI) to facilitate exploration of a design space that includes the plurality of designs.

At least one advantage of the disclosed techniques relative to the prior art is that automatically ranking designs based on examples of user preferences enables users to efficiently and subjectively evaluate different designs. Because of the associated speed increase, the disclosed techniques enlarge the design space and increase the number of designs that can be reviewed compared to prior art approaches. Further, the ranked list of designs allows the user to explore designs that are more likely to conform to the user preferences before other designs that are less likely to conform to the user preferences. Consequently, the exploration of the enlarged design space is more targeted and therefore more effective compared to prior art approaches. These technical advantages provide a substantial technological advancement over prior art solutions.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
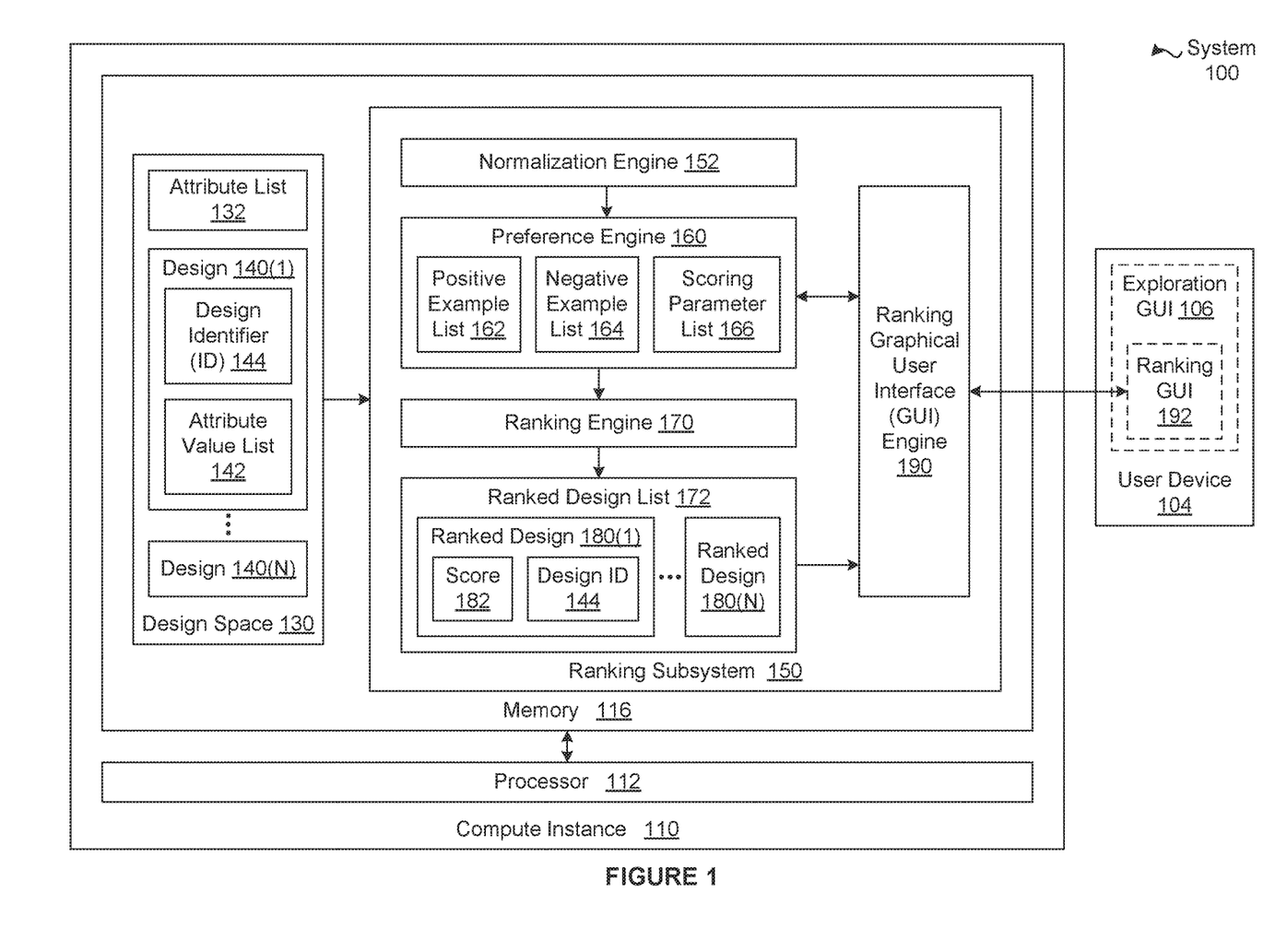
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a computer instance 110 and a user device 104. For explanatory purposes, multiple instances of like objects are denoted with reference numbers identifying the object and parenthetical numbers identifying the instance where needed.

In various embodiments, the system 100 may include any number of compute instances 110 and any number of user devices 104 in any combination. Further, although not shown in FIG. 1, the system 100 may include any number of input devices, any number of output devices, and any number of input/output devices. Each of the input, output, and input/output devices may communicate with any number of the compute instances 110 and any number of the user devices 104 in any combination and in any technically feasible fashion. Any number of the components of the system 100 may be distributed across multiple geographic locations or included in one or more cloud computing environments (i.e., encapsulated shared resources, software, data, etc.) in any combination.

Each of the user devices 104 may be any type of device that is capable of transmitting input data and/or displaying visual content. For example, the user device 104(0) could comprise a game console, a smartphone, a smart television (TV), a laptop, a tablet, or a desktop computer. Notably, one or more of the user devices 104 may also be compute instances 110.

The compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The processor 112 may receive input via any number of input devices and/or any number of input/output devices. The processor 112 may generate pixels for display via any number of output devices and/or any number of input/output devices. Examples of input devices include, without limitation, a mouse, a keyboard, a microphone, and the like. An example of an input/output device is a touch screen. The output device may be any device capable of displaying images and/or visual content, such as a monitor. Each input device, input/output device, and output device may be a stand-alone device or may be integrated into another device, such as the compute instance 110 or one of the user devices 104.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instance 110 included in the system 100 is configured to implement one or more applications. For explanatory purposes only, each application and each subsystem is depicted as residing in the memory 116 of a single compute instance 110 and executing on a processor 112 of the single compute instance 110. However, as persons skilled in the art will recognize, the functionality of each application and subsystem may be distributed across any number of other subsystems and/or applications that reside in the memories 116 of any number of compute instances 110 and execute on the processors 112 of any number of compute instances 110 in any combination. Further, the functionality of any number of subsystems and/or applications may be consolidated into a single application or subsystem.

In general, the system 100 is configured to facilitate evaluating designs as part of a generative design flow. Generative design is a computer-aided design process that automatically synthesizes designs that satisfy any number and type of high-level goals and constraints. In a typical conventional generative design flow, a user specifies the high-level goals and constraints. A generative design application then executes a variety of multi-objective optimization algorithms to optimize potential solutions based on the high-level goals and constraints in an evolutionary process. The evolutionary process typically generates a vast number (e.g., tens of thousands) of designs that satisfy the high-level goals and constraints. The generative design application presents the designs to the user in the context of a design space. Finally, the user explores the design space, evaluating different designs included in the design space to select a single design for production.

A significant drawback of generative design is that evaluating the different designs in the design space is primarily a manual process that can be prohibitively time consuming if not impossible to complete. For example, in a generative design flow for a bicycle frame, a user could specify a variety of functional constraints (e.g., weight, volume, tensile strength, etc.). The generative design application would then typically generate a vast number of designs that satisfy the functional constraints. The number of potential designs could be on the order of thousands, if not tens of thousands. To fully explore the design space, the user would have to manually scrutinize the different designs to select a single design based on user preferences for non-functional, subjective aspects of the design. For example, the user would have to manually scrutinize potentially thousands of different designs to determine which design is both "more or less symmetric" and "skinniest" in appearance.

Because of the prohibitive amount of time required to manually explore the large number of designs typically generated for a given design space, users are often forced limit the number of designs that the generative design application generates. The resulting "limited" design space necessarily omits designs that would be included in the design space that would be generated by an "unlimited" generative design application. If any of the omitted designs were to reflect the preferences of the user better than the designs included in the limited design space, then the user would select a non-optimal design for production.

Automatically Ranking Designs Based on User Preferences

To address the above problems, the system 100 includes, without limitation, a ranking subsystem 150. As shown, the ranking subsystem 150 resides in the memory 116 and executes on the processor 112. In general, the ranking subsystem 150 automatically orders designs 140 included in a design space 130 from most-preferred to least-preferred based on positive example(s) of user preference(s) and/or negative example(s) of user preference(s) to generate a ranked design list 172. A positive example is a design that the user likes. By contrast, a negative example is a design that the user dislikes. The ranked design list 172 is also referred to herein as a "ranked list of designs."

As shown, the design space 130 includes, without limitation, an attribute list 132 and any number of the designs 140. The attribute list 132 includes, without limitation, any number of attributes, where each attribute is associated with a different characteristic of the designs 140. Examples of attributes include, without limitation, mass, volume, tensile strength, material, width, height, and so forth. Each of the designs 140 includes, without limitation, a design identifier (ID) 144 and an attribute value list 142. The design ID 144 uniquely identifies the design 140. The attribute value list 142 includes, without limitation, any number of attribute values. Each attribute value included in the attribute value list 142 for a given design 140 is associated with a different attribute included in the attribute list 132.

The ranking subsystem 150 may acquire the design space 130, the attribute list 132, and the attribute value list 142 in any technically feasible fashion. For instance, in some embodiments, the ranking subsystem 150 may obtain the designs 140 and any number of the attribute values included in the attribute value list 142 from a generative design application. In the same or other embodiments, the ranking subsystem 150 may compute any number of the attribute values included in the attribute value list 142. In some embodiments, the ranking subsystem 150 may acquire the design space 130 via any type of user interface in any technically feasible fashion. For example, the ranking subsystem 150 could receive user input specifying the location of a file storing the deign space 130. The ranking subsystem 150 could receive the user input via an exploration graphical user interface (GUI) 106 associated with the ranking subsystem 150 and/or the generative design application.

For explanatory purposes only, the system 100 is described in the context of a generative design flow. More specifically, a generative design application generates the designs 140, and the generated designs 140 define the design space 130. In alternate embodiments, the system 100 may be configured to facilitate exploration of any type of designs that share one or more attributes and are grouped together in any technically feasible fashion. As referred to herein, a design is a plan or other computer representation of any type of item.

As shown, the ranking subsystem 150 includes, without limitation, a ranking graphical user interface (GUI) engine 190, a normalization engine 152, a preference engine 160, a ranking engine 170, and the ranked design list 172. The GUI engine 190 generates and updates a ranking GUI 192 that is included in the exploration GUI 106. In alternate embodiments, the ranking GUI 192 may be a stand-alone GUI and the exploitation GUI 106 may be omitted from the system 100. In other embodiments, the ranking GUI 192 may be replaced with any other type of user interface or application programming interface, and the functionality of the ranking GUI engine 190 and the ranking subsystem 150 may be modified accordingly. The exploration GUI 106 and the ranking GUI 192 are described in greater detail in conjunction with FIG. 2.

After the ranking subsystem 150 acquires the design space 130, for each of the attributes included in the attribute list 132, the normalization engine 152 normalizes the associated attribute values included in the different attribute value lists 142. As a result of the normalization, for each attribute, the associated attribute values range from 0 to 1. In alternate embodiments, the ranking subsystem 150 may perform any number (including zero) and type of scaling operations on the attributes instead of or in addition to normalization operations.

The preference engine 160 includes, without limitation, a positive example list 162, a negative example list 164, and a scoring parameter list 166. The positive example list 162 includes, without limitation, any number of positive examples of one or more user preferences. In a complementary fashion, the negative example list 164 includes, without limitation, any number of negative examples of one or more user preference. More precisely, each positive example is a different design 140 that the user likes, while each negative example is a different design 140 that the user dislikes.

In operation, the preference engine 160 initially creates the positive example list 162 and the negative example lists 164 as empty lists. Subsequently, as described in greater detail in conjunction with FIG. 2, the preference engine 160 determines that the user likes or dislikes a design 140 based on user input received via the ranking GUI 182. If the preference engine 160 determines that the user likes the design 140, then the preference engine 160 adds the design 140 to the positive example list 162. If, however, the preference engine 160 determines that the user dislikes the design 150, then the preference engine 160 adds the design 140 to the negative example list 165. In this fashion, the preference engine 160 includes each design 140 included in the design space 130 in the positive example list 162, the negative example list 164, or neither. The positive examples and negative examples are collectively referred to herein as "the example designs 140."

The scoring parameter list 166 includes, without limitation, any number (including zero) and type of options that configure how the ranking engine 170 operates. For instance, in some embodiments, the scoring parameter list 166 includes, without limitation, a scoring algorithm selection, a global attribute mask, and any number of local attribute masks. The scoring algorithm selection specifies either a local scoring algorithm or a global scoring algorithm. The local scoring algorithm and the global scoring algorithm are described in greater detail below.

The global attribute mask specifies which of the attributes the ranking engine 170 is to consider when determining scores for the designs 140 based on the global scoring algorithm. Each of the designs 140 is associated with a different local attribute mask that specifies which of the associated attribute values the ranking engine 170 is to consider when determining scores 182 for the designs 140. based on the global scoring algorithm.

Initially, the preference engine 160 sets the scoring algorithm selection to the local scoring algorithm, the global attribute mask to specify all the attributes, and each of the local attribute masks to specify all the associated attribute values. Subsequently, as described in detail in conjunction with FIG. 2, the preference engine 160 adjusts the scoring parameters based on user input received via the ranking GUI 192. In alternate embodiments, the preference engine 160 may influence or enable the user to influence the behavior of the ranking engine 170 in any technically feasible fashion.

The ranking engine 170 generates the ranked design list 172 based on the positive example list 162, the negative example list 164, and a ranking algorithm. In some embodiments, the scoring parameter list 166 impacts the behavior of the ranking engine 170. The ranking engine 170 may generate the ranked design list 172 at any time and in response to any number and type of stimulus. For instance, in some embodiments, the ranking engine 170 generates the ranked design list 172 based on user input received via the ranking GUI 192. In other embodiments, the ranking engine 170 is configured to generate the ranked design list 172 periodically (e.g., every minute).

As shown, the ranked design list 172 includes, without limitation, one or more ranked designs 180. Each of the ranked designs 180 corresponds to one of the designs 140. Consequently, the number of the ranked designs 180 is equal to the number of the designs 140. As shown, each of the ranked designs 180 includes, without limitation, the design ID 144 of one of the designs 140 and a score 182 associated with the design 140. In general, the score 182 indicates a degree to which the associated design 140 conforms to one or more user preferences.

For each of the designs 140, the ranking engine 170 computes the associated score 182 based on the positive example list 162, the negative example list 165, and a ranking algorithm. The ranking engine 170 may implement any number and type of ranking algorithms in any technically feasible fashion. Further, the ranking engine 170 may select and execute one of multiple ranking algorithms based on any criteria (e.g., a scoring algorithm selection included in the scoring parameters 166). In some embodiments, the ranking engine 180 implements a local scoring algorithm and a global scoring algorithm.

When executing the local scoring algorithm, the ranking engine 170 computes the scores 182 based on at least one of similarities to the designs 140 included in the positive example list 162 and similarities to the designs 140 included in the negative example list 164. In general, the score 182 of a given design 140 reflects a degree of similarity between the design 140 and the positive examples as well as a degree of dissimilarity between the design 140 and the negative examples. For example, if the design 140 is relatively similar to the positive examples and relatively dissimilar to the negative examples, then the ranking engine 170 computes a relatively high associated score 182.

In operation, the ranking engine 170 computes a pairwise root-mean-square-error (RMSE) between the attribute values of each of the designs 140 and each of the example designs 140. The ranking engine 170 then sums the RMSEs associated with the positive examples to generate a "like score." Similarly, the ranking engine 170 sums the RMSEs associated with the negative examples to generate a "dislike score." More precisely, suppose d is the design 140, a is an attribute, attrval(d, a) is the normalized attribute value for the design 140, $I_d$ is a positive example, and $d_d$ is a negative example. In some embodiments, the ranking engine 170 may compute the score 182 based on equations 1-3:

$$\text{likeScore}(d) = \Sigma_{l_d \in like} \text{RMSE}(\text{attrval}(d,a) - \text{attval}(l_d,a)) \quad (1)$$

$$\text{dislikeScore}(d) = \Sigma_{d_d \in dislike} \text{RMSE}(\text{attrval}(d,a) - \text{attval}(d_d,a)) \quad (2)$$

$$\text{score}(d) = \text{likeScore}(d) + (1 - \text{dislikeScore}(d)) \quad (3)$$

By contrast, when executing the global scoring algorithm, the ranking engine 170 computes the scores 182 based on patterns that distinguish between positive examples and negative examples. In general, for each attribute, the ranking engine 170 computes a mean value for the associated attribute values included in the different attribute value lists 142. For each attribute, the ranking engine 170 then computes an associated weight based on the mean value, the positive examples, and the negative examples. Finally, for each of the designs 140, the ranking engine 170 computes the associated score 182 based on the local attribute mask, the weights associated with the different attributes, and the associated attribute value list 142.

More precisely, suppose d is the design 140, a is an attribute, attrval(d, a) is the normalized attribute value for the design 140, $I_d$ is a positive example, and $d_d$ is a negative example. Further, suppose that globalmask(a) is a bit included in the global attribute mask which, when equal to 1, indicates that the attribute a is to be considered when computing the scores 182. Finally, suppose that localmask (d,a) is a bit included in the local attribute mask associated with the design 140, which, when equal to 1, indicates that the attribute a is to be considered when computing the scores 182. In some embodiments, the rating engine 170 may compute the score 182 based on equations 4-6:

$$\text{attrmean}(D, a) = \frac{\sum_{d \in D} \text{localmask}(d, a) \cdot \text{attrval}(d, a)}{\sum_{d \in D} \text{localmask}(d, a)} \quad (4)$$

$$\text{weight}(a) = \frac{\text{attrmean}(D_{like}, a) - \text{attrmean}(D_{dislike}, a)}{\sqrt{\sum_{a \in A} |(\text{attrmean}(D_{like}, a) - \text{attrmean}(D_{dislike}, a))^2|}} \quad (5)$$

$$\text{score}(d) = \sum_{a \in A} \text{globalmask}(a) \cdot \text{weight}(a) \cdot \text{attrval}(d, a) \quad (6)$$

As persons skilled in the art will recognize, the weight associated with an attribute correlates to the capacity of the attribute to differentiate between the positive examples and the negative examples. If the capacity of an attribute to differentiate between the positive examples and the negative examples is relatively high, then the computed weight associated with the attribute is also relatively high. In some embodiments, the ranking GUI 192 provides one or more mechanisms for overriding the computed weights with user-specified weights. Upon receiving one or more user-specified weights, the ranking engine 170 replaces the associated computed weight(s) with the user-specified weights and re-computes the scores 182.

After computing or re-computing the scores 182, the ranking engine 170 normalizes the scores 182. Subsequently, the ranking engine 170 orders the designs 140 based on the scores 182 to generate the ranked design list 172. Finally, the ranking GUI engine 190 displays the ranked design list 172 to the user via the ranking GUI 192. In various embodiments, the ranking GUI engine 190 may update the ranking GUI 192 to specify any amount of additional information relevant to evaluating the designs 140. For instance, in some embodiments, the ranking GUI 192 depicts any number of the scores 182. In the same or other embodiments, the ranking GUI 192 depicts the weights associated with the attributes. In alternate embodiments, the ranking subsystem 150 may provide the ranked design list 172 and any associated information to any number of users and/or any number of applications in any technically feasible fashion.

Note that the techniques described herein are illustrative rather than restrictive, and may be altered without departing from the broader spirit and scope of the invention. Many modifications and variations on the functionality provided by the ranking subsystem 150, the normalization engine 152, the preference engine 160, the ranking engine 170, the ranking GUI engine 190, and the ranking GUI 192 will be apparent to those of ordinary skill in the art without departing from the scope and spirit of the described embodiments.

It will be appreciated that the system 100 shown herein is illustrative and that variations and modifications are possible. For example the functionality provided by the ranking subsystem 150, the normalization engine 152, the preference engine 160, the ranking engine 170, and the ranking GUI engine 190 as described herein may be integrated into or distributed across any number of software applications (including one) and any number of components of the system 100. Further, the connection topology between the various units in FIG. 1 may be modified as desired.

Exploring the Design Space

Figure 2:
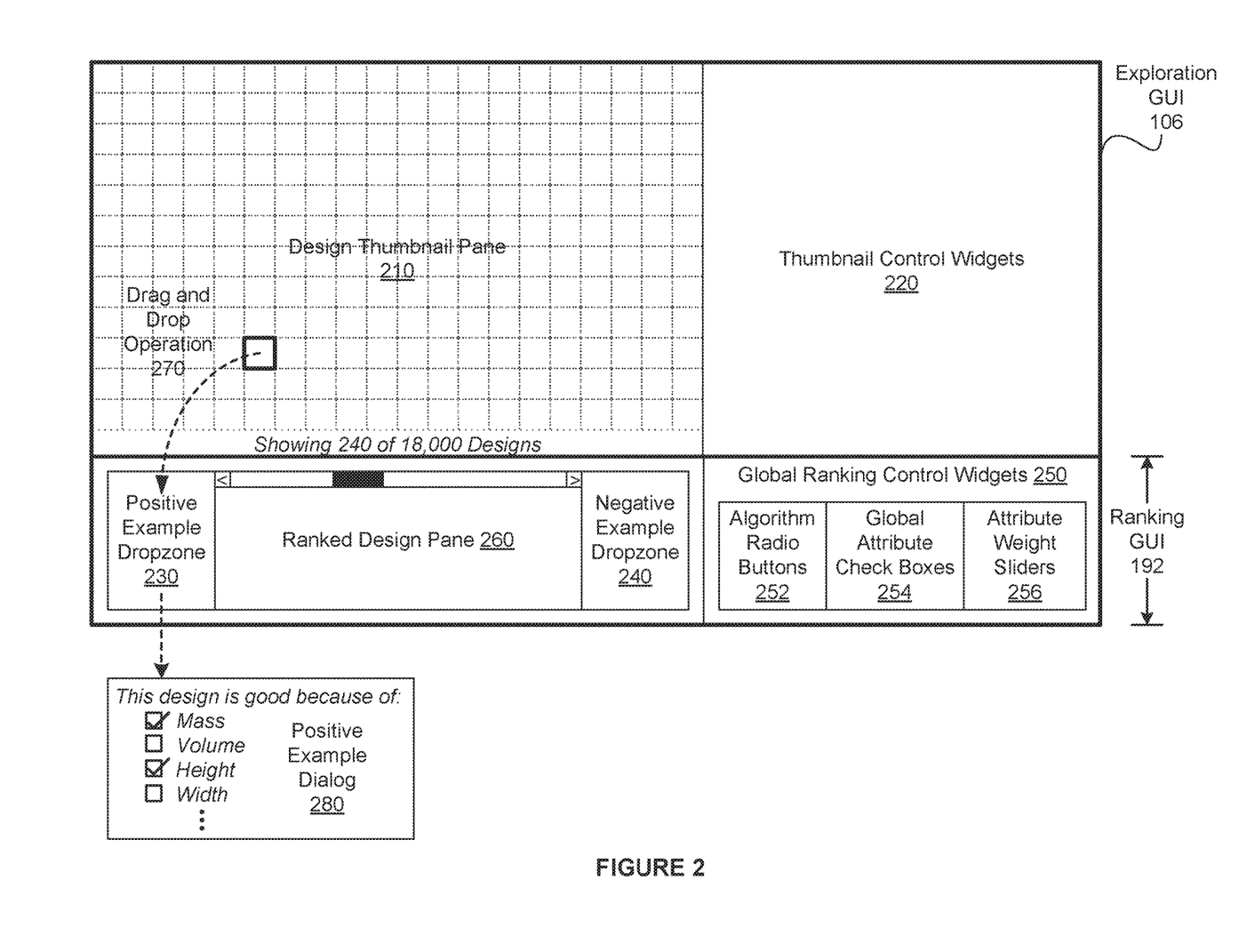
FIG. 2 is an exemplary illustration of the exploration graphical user interface (GUI) of FIG. 1, according to various embodiments of the present invention.

FIG. 2 is an exemplary illustration of the exploration graphical user interface (GUI) 106 of FIG. 1, according to various embodiments of the present invention. As shown, the exploration GUI 106 includes, without limitation, a design thumbnail pane 210, any number of thumbnail control widgets 220, and the ranking GUI 192. In alternate embodiments, the functionality of the exploration GUI 106 may be included in the ranking GUI 192, and the exploration GUI 106 may be omitted from the system 100. In general, the exploration GUI 106 and the ranking GUI 192 provide any number and type of visual components (e.g., interface widgets, search widgets, sliders, buttons, panels, tabs, etc.) that enable a user to quickly and efficiently perform search operations, sorting operations, filtering operations, ranking operations, and the like, on the designs 140 included in the design space 130.

The design thumbnail pane 210 enables the user to view thumbnails representing the designs 140 included in the design space 130. In general, the exploration GUI 106 displays only a small portion of the designs 140. As depicted, the exploration GUI 106 displays 240 of the 18,000 designs 140. The thumbnail control widgets 220 include, without limitation, any number and type of visual components that enable the user to perform filtering operations, selection operations, and the like on the designs 140.

The ranking GUI 192 includes, without limitation, a positive example dropzone 230, a negative example dropzone 240, a ranked design pane 260, and global ranking control widgets 250. The positive example dropzone 230 enables the user to specify that a selected design 140 is a "good" design 140 that conforms to one or more user preferences. By contrast, the negative example dropzone 240 enables the user to specify that a selected design 140 is a "bad" design 140 that does not conform to one or more user preferences.

To specify that the design 140 is a good design 140, the user selects the thumbnail associated with the design 140 and performs a drag and drop operation 270. More precisely, the user drags the selected thumbnail from the design thumbnail pane 210 to the positive example dropzone 230. As a result of the drag and drop operation 270, the preference engine 150 adds the design 140 to the positive example list 162.

Subsequently, the ranking GUI 192 displays a positive example dialog 280 that allows the user to specify the attributes that contribute to the user's categorization of the design 140 as a positive example. As shown, the user specifies that the mass and the height associated with the design 140 conform to one or more of the user's preferences. The preference engine 150 then updates the local attribute mask associated with the selected design 140 to specify that the ranking engine 170 is to consider attribute values associated with the design 140 and corresponding to the mass and height attributes when computing the scores 182. In alternate embodiments, the ranking GUI 192 may provide any number of mechanisms that enable the user to mark a design 140 as either a positive example or a negative example.

The ranked display pane 260 displays the ranked design list 172. As shown, the ranked display pane 260 may include any number of mechanisms that enable the user to scroll through the ranked design list 172. In various embodiments, the ranking GUI 192 may display any amount and type of additional information relevant to the ranked design list 172 via the ranked display pane 260. For instance, in some embodiments, the ranking GUI 192 may display one or more scores 182. The ranked display pane 260 may display the ranked design list 172 in any technically feasible fashion. For instance, in some embodiments, the ranking GUI 192 depicts points representing the different designs 140 from left to right, where the "best" design associated with the highest score 182 is the leftmost point and the "worst" design associated with the lowest score 182 is the rightmost point.

The global ranking control widgets 250 include, without limitation, algorithm radio buttons 252, global attribute check boxes 254, and attribute weight sliders 254. The algorithm radio buttons 252 allow the user to set the scoring algorithm selection to either the local ranking algorithm or the global ranking algorithm. The global attribute check boxes 254 enable the user to specify the global attribute mask. When the scoring algorithm selection is the global ranking algorithm, the attribute weight sliders 254 visually depict the computed weights for each of the attribute. Further, the attribute weight sliders 254 enable the user to override the computed weight(s) for any number of the attributes.

Advantageously, by automatically ranking the 18,000 designs 140 based on the positive examples and the negative examples and then depicting the resulting ranked design list 172 via the ranking GUI 192, the ranking subsystem 150 facilitates efficient exploration of the design space 130. As a result, the user may rapidly and judiciously select one of the designs 140 for production.

Figure 3:
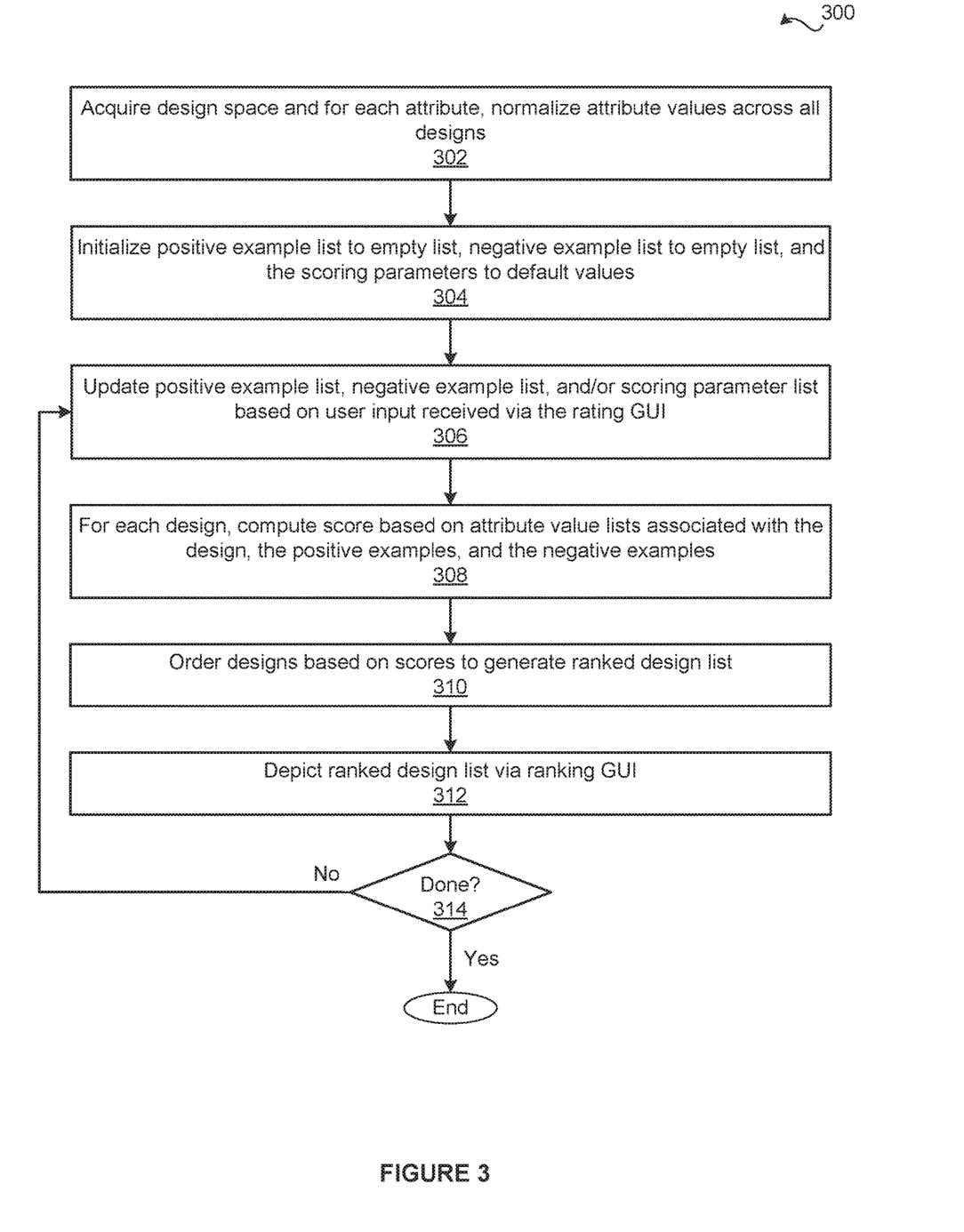
FIG. 3 is a flow diagram of method steps for automatically evaluating different designs included a design space, according to various embodiments of the present invention.

FIG. 3 is a flow diagram of method steps for automatically evaluating different designs included in a design space, according to various embodiments of the present invention. Although the method steps are described with reference to the systems of FIGS. 1-2, persons skilled in the art will understand that any system configured to implement the method steps, in any order, falls within the scope of the present invention.

As shown, a method 300 begins at step 302, where the ranking subsystem 150 acquires the design space 130 and the normalization engine 152 normalizes the attribute value lists 142 across the designs 140. At step 304, the preference engine 160 initializes the positive example list 162 to an empty list, the negative example list 164 to an empty list, and sets any scoring parameters included in the scoring parameter list 166 to default values. At step 306, the ranking engine 170 updates the positive example list 162, the negative example list 164, and/or the scoring parameter list 166 based on user input received via the rating GUI 192.

At step 308, for each of the designs 140, the ranking engine 170 computes the score 186 based on the attribute value list 142 associated with the design 140, the attribute value list(s) 142 associated with the positive example list 162, and the attribute value list(s) 142 associated with the negative example list 164. At step 310, the ranking engine 170 orders the designs 140 based on the associated scores 182. At step 312, the ranking engine 170 depicts the ranked design list 172 via the ranking GUI 192.

At step 314, the ranking engine 170 determines whether the ranking subsystem 150 is to finish executing. The ranking engine 170 may determine whether the ranking subsystem 150 is to finish executing in any technically feasible fashion. For example, the ranking subsystem 150 could determine that the user is attempting to close the ranking GUI 192. If, at step 314, the ranking engine 170 determines that the ranking subsystem 150 is to continue executing, then the method 300 returns to step 306. At step 306, the ranking engine 170 updates the positive example list 162, the negative example list 164, and/or the scoring parameter list 166 based on user input received via the rating GUI 192. If, however, at step 314, the ranking engine 170 determines that the ranking subsystem 150 is to finish executing, then the ranking subsystem 150 stops executing and the method 300 terminates.

In sum, the disclosed techniques may be used to rank designs included in a design space. Each design in the design space is associated with a different attribute value list. Each of the attribute value lists specifies different values for a single attribute list. A ranking subsystem includes, without limitation, a ranking graphics user interface (GUI) engine, a normalization engine, a preference engine, and a ranking engine. The ranking GUI engine generates and updates a ranking GUI. The ranking GUI enables the ranking subsystem to interact with a user. After the ranking subsystem acquires the design space, the normalization engine normalizes the different associated attribute values included in the different attribute value lists. As a result of the normalization, for each attribute, the associated attribute values range from 0 to 1. Subsequently, the preference engine identifies positive examples and negative examples based on user input indicating designs that the user, respectively, likes and dislikes.

For each design included in the design space, the ranking engine computes a score based on a scoring algorithm, the attribute value list associated with the design, the attribute value lists for the positive examples, and the attribute value lists for the negative examples. In some embodiments, the scoring algorithm is a local scoring algorithm that score designs based on at least one of similarities to positive examples and similarities to negative examples. In other embodiments, the scoring algorithm is a global scoring algorithm that scores designs based on patterns that distinguish between positive examples and negative examples. The ranking engine then orders the designs based on the scores to generate a ranked design list that the ranking engine displays to the user via the ranking GUI.

At least one improvement of the disclosed techniques relative to prior art is that automatically ranking designs based on positive examples and negative examples reduces both the time and manual effort typically associated with prior art design evaluation techniques. As a result, the disclosed techniques facilitate generative design flows that synthesize vast numbers (e.g., tens of thousands) of designs satisfying functional design criteria. In particular, unlike prior art approaches, the time required to effectively explore a design space does not typically compel users to limit the number of generated designs. Importantly, as the number of generated designs increases, the likelihood that one of the generated designs is an optimal design with respect to the user preferences also increases. In addition, the ranked design list enables the user to explore designs that are more likely to conform to the user preferences before other designs that are less likely to conform to the user preferences. Consequently, the exploration of the design space is more targeted and therefore more effective compared to prior art approaches. These technical advantages provide a substantial technological advancement over prior art solutions.

1. In some embodiments, a computer-implemented method for automatically ranking designs comprises determining that a first design included in a plurality of designs comprises a first positive example of one or more user preferences; computing a first score associated with a second design that also is included in the plurality of designs based on a first attribute value associated with both a first attribute and the first design and a second attribute value associated with both the first attribute and the second design; ordering the designs included in the plurality of designs based on the first score and a second score associated with the first design to generate a ranked list of designs, wherein the order of the designs included in the ranked list of designs reflects the one or more user preferences; and displaying the ranked list of designs via a graphical user interface (GUI) to facilitate exploration of a design space that includes the plurality of designs.

2. The computer-implemented method of clause 1, wherein a scoring algorithm that scores designs based on at least one of similarities to positive examples and similarities to negative examples computes the first score based on the first attribute value and the second attribute value.

3. The computer-implemented method of clauses 1 or 2, wherein a scoring algorithm that scores designs based on patterns that distinguish between positive examples and negative examples. computes the first score based on the first attribute value and the second attribute value.

4. The computer-implemented method of any of clauses 1-3, wherein the first attribute value is included in a first plurality of attribute values associated with the first design, the second attribute value is included in a second plurality of attribute values associated with the second design, and computing the first score comprises calculating a positive score based on a pairwise root-mean-square-error (RMSE) between the second plurality of attribute values and the first plurality of attribute values; calculating a negative score based on a pairwise RMSE between the second plurality of attribute values and a third plurality of attribute values associated with a third design that comprises a first negative example of the one or more user preferences; and performing one or more mathematical operations between the positive score and the negative score.

5. The computer-implemented method of any of clauses 1-4 wherein the first attribute is included in a plurality of attributes, and computing the first score comprises: computing a first weighting for the first attribute based on the first attribute value and at least a third attribute value associated with both the first attribute and a third design that comprises either a first negative example of the one or more user preferences or a second positive example of the one or more user preferences; performing a multiplication operation between the second attribute value and the first weighting to generate a first weighted value; and performing an addition operation between the first weighted value and a partial score that is associated with at least a second attribute included in the plurality of attributes.

6. The computer-implemented method of any of clauses 1-5, further comprising computing the second score based on the first weighting and the first attribute value.

7. The computer-implemented method of any of clauses 1-6, further comprising performing one or more normalization operations on a plurality of original attribute values to generate a plurality of attribute values that includes the first attribute value and the second attribute value.

8. The computer-implemented method of any of clauses 1-7, further comprising, prior to computing the first score, receiving user input via the GUI indicating that the first attribute value is to be considered when computing the first score.

9. The computer-implemented method of any of clauses 1-8, wherein determining that the first design comprises the first positive example of the one or more user preferences comprises receiving user input via the GUI indicating that the user likes the first design.

10. The computer-implemented method of any of clauses 1-9, further comprising generating the plurality of designs using a generative design algorithm.

11. In some embodiments, a computer-readable storage medium includes instructions that, when executed by a processing unit, cause the processing unit to automatically rank designs by performing the steps of determining that a first design included in a plurality of designs comprises a first positive example of one or more user preferences; computing a first score associated with a second design that also is included in the plurality of designs based on a first attribute value associated with both a first attribute and the first design and a second attribute value associated with both the first attribute and the second design; ordering the designs included in the plurality of designs based on the first score and a second score associated with the first design to generate a ranked list of designs, wherein the order of the designs included in the ranked list of designs reflects the one or more user preferences; and displaying the ranked list of designs via a graphical user interface (GUI) to facilitate exploration of a design space that includes the plurality of designs.

12. The computer-readable storage medium of clause 11, wherein a scoring algorithm that scores designs based on at least one of similarities to positive examples and similarities to negative examples computes the first score based on the first attribute value and the second attribute value.

13. The computer-readable storage medium of clauses 11 or 12, wherein a scoring algorithm that scores designs based on patterns that distinguish between positive examples and negative examples computes the first score based on the first attribute value and the second attribute value.

14. The computer-readable storage medium of any of clauses 11-13, wherein the first attribute value is included in a first plurality of attribute values associated with the first design, the second attribute value is included in a second plurality of attribute values associated with the second design, and computing the first score comprises calculating a pairwise root-mean-square-error (RMSE) between the second plurality of attribute values and the first plurality of attribute values.

15. The computer-readable storage medium of any of clauses 11-14, wherein the first attribute is included in a plurality of attributes, and computing the first score comprises computing a first weighting for the first attribute based on the first attribute value and at least a third attribute value associated with both the first attribute and a third design that comprises either a first negative example of the one or more user preferences or a second positive example of the one or more user preferences; performing a multiplication operation between the second attribute value and the first weighting to generate a first weighted value; and performing an addition operation between the first weighted value and a partial score that is associated with at least a second attribute included in the plurality of attributes.

16. The computer-readable storage medium of any of clauses 11-15, further comprising displaying the first weighting via the GUI; receiving, via the GUI, new user input that specifies a second weighting associated with the first attribute; computing both a third score associated with the second design and a fourth score associated with the first design based on the second weighting; re-ordering the designs included in the plurality of designs based on the third score and the fourth score to generate a modified ranked list of designs, wherein the order of the modified ranked list of designs reflects the new user input; and displaying the modified ranked list of designs instead of the ranked list of designs via the GUI to facilitate exploration of the design space.

17. The computer-readable storage medium of any of clauses 11-16, further comprising performing one or more normalization operations on a plurality of original attribute values to generate a plurality of attribute values that includes the first attribute value and the second attribute value.

18. The computer-readable storage medium of any of clauses 11-17, further comprising, prior to computing the first score, receiving user input via the GUI indicating that the first attribute is to be considered when computing the first score.

19. The computer-readable storage medium of any of clauses 11-18, wherein determining that the first design comprises the first positive example of the one or more user preferences comprises receiving user input via the GUI indicating that the user likes the first design.

20. In some embodiments, a system comprises a memory storing instructions; and a processor that is coupled to the memory and, when executing the instructions, is configured to determine that a first design included in a plurality of designs comprises a first positive example of one or more user preferences; compute a first score associated with a second design that also is included in the plurality of designs based on a first attribute value associated with both a first attribute and the first design and a second attribute value associated with both the first attribute and the second design; order the designs included in the plurality of designs based on the first score and a second score associated with the first design to generate a ranked list of designs, wherein the order of the designs included in the ranked list of designs reflects the one or more user preferences; and display the ranked list of designs via a graphical user interface (GUI) to facilitate exploration of a design space that includes the plurality of designs.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically ranking designs, the method comprising:
    based on first input received via a graphical user interface (GUI), determining that a first design included in a plurality of designs is designated as a first positive example included in one or more positive examples of one or more user preferences;
    receiving, via the GUI, second input indicating at least one design attribute associated with the first design that qualifies the first design as the first positive example;
    receiving, via the GUI, third input indicating a selection of a local scoring algorithm or a global scoring algorithm, wherein the local scoring algorithm and the global scoring algorithm comprise different algorithms for computing a score for a given design, wherein the local scoring algorithm is based on at least one difference between a value of a first attribute for the given design and a corresponding value of the first attribute for the one or more positive examples and at least one difference between the value of the first attribute for the given design and a corresponding value of the first attribute for one or more negative examples, and the global scoring algorithm is based on a first weighted value for the first attribute that represents a difference between an average of attribute values of the first attribute for the one or more positive examples and an average of attribute values of the first attribute for the one or more negative examples;
    determining a first attribute value for a first design attribute included in the at least one design attribute based on the first design;
    determining a second attribute value for the first design attribute based on a second design that also is included in the plurality of designs;
    computing a first score for the second design based on the first attribute value, the second attribute value, and either the local scoring algorithm or the global scoring algorithm as indicated by the third input;
    ordering the designs included in the plurality of designs based on the first score and a second score associated with the first design to generate a ranked list of designs, wherein the order of the designs included in the ranked list of designs reflects the one or more user preferences; and
    displaying the ranked list of designs via the GUI to facilitate exploration of a design space that includes the plurality of designs.

2. The computer-implemented method of claim 1, wherein the local scoring algorithm computes the first score based on the first attribute value and the second attribute value.

3. The computer-implemented method of claim 1, wherein the global scoring algorithm comprises a scoring algorithm that scores designs based on patterns that distinguish between positive examples and negative examples and computes the first score based on the first attribute value and the second attribute value.

4. The computer-implemented method of claim 1, wherein the first attribute value is included in a first plurality of attribute values associated with the first design, the second attribute value is included in a second plurality of attribute values associated with the second design, and computing the first score comprises:

calculating a positive score based on a pairwise root-mean-square-error (RMSE) between the second plurality of attribute values and the first plurality of attribute values;

calculating a negative score based on a pairwise RMSE between the second plurality of attribute values and a third plurality of attribute values associated with a third design that comprises a first negative example of the one or more user preferences; and performing one or more mathematical operations between the positive score and the negative score.

5. The computer-implemented method of claim 1, wherein computing the first score comprises:

computing a first weighting for the first design attribute based on the first attribute value and at least a third attribute value associated with both the first design attribute and a third design that comprises either a first negative example of the one or more user preferences or a second positive example of the one or more user preferences;

performing a multiplication operation between the second attribute value and the first weighting to generate a first weighted value; and performing an addition operation between the first weighted value and at least a second weighted value that is associated with at least a second design attribute included in the at least one design attribute.

6. The computer-implemented method of claim 5, further comprising computing the first weighting for the first design attribute based on a difference between a mean of attribute values for the first design attribute associated with each of the plurality of designs which are positive examples and a mean of attribute values for the first design attribute associated with each of the plurality of designs which are negative examples.

7. The computer-implemented method of claim 1, further comprising performing one or more normalization operations on a plurality of original attribute values to generate a plurality of attribute values that includes the first attribute value and the second attribute value.

8. The computer-implemented method of claim 1, wherein receiving the second input comprises receiving user input via the GUI indicating that the first attribute value is to be considered when computing the first score.

9. The computer-implemented method of claim 1, wherein determining that the first design is designated as the first positive example of the one or more user preferences comprises receiving user input via the GUI indicating that the user likes the first design.

10. The computer-implemented method of claim 1, further comprising generating the plurality of designs using a generative design algorithm.

11. One or more non-transitory computer-readable storage media including instructions that, when executed by one or more processing units, cause the one or more processing units to automatically rank designs by performing the steps of:

based on first input received via a graphical user interface (GUI), determining that a first design included in a plurality of designs is designated as a first positive example included in one or more positive examples of one or more user preferences;

receiving, via the GUI, second input indicating at least one design attribute associated with the first design that qualifies the first design as the first positive example;

receiving, via the GUI, third input indicating a selection of a local scoring algorithm or a global scoring algorithm, wherein the local scoring algorithm and the global scoring algorithm comprise different algorithms for computing a score for a given design, wherein the local scoring algorithm is based on at least one difference between a value of a first attribute for the given design and a corresponding value of the first attribute for the one or more positive examples and at least one difference between the value of the first attribute for the given design and a corresponding value of the first attribute for one or more negative examples, and the global scoring algorithm is based on a first weighted value for the first attribute that represents a difference between an average of attribute values of the first attribute for the one or more positive examples and an average of attribute values of the first attribute for the one or more negative examples;

determining a first attribute value for a first design attribute included in the at least one design attribute based on the first design;

determining a second attribute value for the first design attribute based on a second design that also is included in the plurality of designs;

computing a first score for the second design based on the first attribute value, the second attribute value, and either the local scoring algorithm or the global scoring algorithm as indicated by the third input;

ordering the designs included in the plurality of designs based on the first score and a second score associated with the first design to generate a ranked list of designs, wherein the order of the designs included in the ranked list of designs reflects the one or more user preferences; and displaying the ranked list of designs via the GUI to facilitate exploration of a design space that includes the plurality of designs.

12. The one or more non-transitory computer-readable storage media of claim 11, wherein the local scoring algorithm computes the first score based on the first attribute value and the second attribute value.

13. The one or more non-transitory computer-readable storage media of claim 11, wherein the global scoring algorithm comprises a scoring algorithm that scores designs based on patterns that distinguish between positive examples and negative examples and computes the first score based on the first attribute value and the second attribute value.

14. The one or more non-transitory computer-readable storage media of claim 11, wherein the first attribute value is included in a first plurality of attribute values associated with the first design, the second attribute value is included in a second plurality of attribute values associated with the second design, and computing the first score comprises calculating a pairwise root-mean-square-error (RMSE) between the second plurality of attribute values and the first plurality of attribute values.

15. The one or more non-transitory computer-readable storage media of claim 11, wherein computing the first score comprises:

computing a first weighting for the first design attribute based on the first attribute value and at least a third attribute value associated with both the first design attribute and a third design that comprises either a first negative example of the one or more user preferences or a second positive example of the one or more user preferences;

performing a multiplication operation between the second attribute value and the first weighting to generate a first weighted value; and performing an addition operation between the first weighted value and at least a second weighted value that is associated with at least a second design attribute included in the at least one design attribute.

16. The one or more non-transitory computer-readable storage media of claim 15, wherein the steps further comprise:
displaying the first weighting via the GUI;
receiving, via the GUI, new user input that specifies a second weighting associated with the first design attribute;
computing both a third score associated with the second design and a fourth score associated with the first design based on the second weighting;
re-ordering the designs included in the plurality of designs based on the third score and the fourth score to generate a modified ranked list of designs, wherein the order of the modified ranked list of designs reflects the new user input; and
displaying the modified ranked list of designs instead of the ranked list of designs via the GUI to facilitate exploration of the design space.

17. The one or more non-transitory computer-readable storage media of claim 11, wherein the steps further comprise performing one or more normalization operations on a plurality of original attribute values to generate a plurality of attribute values that includes the first attribute value and the second attribute value.

18. The one or more non-transitory computer-readable storage media of claim 11, wherein receiving the second input comprises receiving user input via the GUI indicating that the first design attribute is to be considered when computing the first score.

19. The one or more non-transitory computer-readable storage media of claim 11, wherein determining that the first design is designated as the first positive example of the one or more user preferences comprises receiving user input via the GUI indicating that the user likes the first design.

20. A system, comprising:
one or more memories storing instructions; and
one or more processors that are coupled to the one or more memories and, when executing the instructions, are configured to:
based on first input received via a graphical user interface (GUI), determine that a first design included in a plurality of designs is designated as a first positive example included in one or more positive examples of one or more user preferences;
receive, via the GUI, second input indicating at least one design attribute associated with the first design that qualifies the first design as the first positive example;
receive, via the GUI, third input indicating a selection of a local scoring algorithm or a global scoring algorithm, wherein the local scoring algorithm and the global scoring algorithm comprise different algorithms for computing a score for a given design, wherein the local scoring algorithm is based on at least one difference between a value of a first attribute for the given design and a corresponding value of the first attribute for the one or more positive examples and at least one difference between the value of the first attribute for the given design and a corresponding value of the first attribute for one or more negative examples, and the global scoring algorithm is based on a first weighted value for the first attribute that represents a difference between an average of attribute values of the first attribute for the one or more positive examples and an average of attribute values of the first attribute for the one or more negative examples;
determine a first attribute value for a first design attribute included in the at least one design attribute based on the first design;
determine a second attribute value for the first design attribute based on a second design that also is included in the plurality of designs;
compute a first score for the second design based on the first attribute value, the second attribute value, and either the local scoring algorithm or the global scoring algorithm as indicated by the third input;
order the designs included in the plurality of designs based on the first score and a second score associated with the first design to generate a ranked list of designs, wherein the order of the designs included in the ranked list of designs reflects the one or more user preferences; and
display the ranked list of designs via the GUI to facilitate exploration of a design space that includes the plurality of designs.

* * * * *